US007613594B2

(12) United States Patent
Lechine

(10) Patent No.: US 7,613,594 B2
(45) Date of Patent: Nov. 3, 2009

(54) METHOD AND COMPUTER PROGRAM PRODUCT OF COMPUTER AIDED DESIGN OF A PRODUCT COMPRISING A SET OF CONSTRAINED OBJECTS

(75) Inventor: Emmanuel Lechine, Paris (FR)

(73) Assignee: Dassault Systemes, Suresnes, Cedex (FR)

( * ) Notice: Subject to any disclaimer, the term of this patent is extended or adjusted under 35 U.S.C. 154(b) by 76 days.

(21) Appl. No.: 11/965,403

(22) Filed: Dec. 27, 2007

(65) Prior Publication Data

US 2008/0162091 A1 Jul. 3, 2008

(30) Foreign Application Priority Data

Dec. 28, 2006 (EP) ................................ 06292061

(51) Int. Cl.
*G06F 17/50* (2006.01)

(52) U.S. Cl. .................. 703/1; 703/2; 703/6; 345/419; 345/420; 345/619; 700/98; 715/763

(58) Field of Classification Search .................... 703/6, 703/1, 2; 706/45; 715/764; 345/651, 419, 345/619, 420; 700/98; 707/104.1, 9
See application file for complete search history.

(56) References Cited

U.S. PATENT DOCUMENTS 5,617,510 A 4/1997 Keyrouz et al.
6,385,563 B1 5/2002 Vora et al.
RE39,950 E * 12/2007 Gantt et al. ................. 345/651
2002/0018061 A1* 2/2002 Gantt ......................... 345/419
2002/0123812 A1* 9/2002 Jayaram et al. ............... 700/98
2003/0067487 A1 4/2003 Kohls et al.
2005/0060130 A1* 3/2005 Shapiro et al. ................. 703/2
2005/0209831 A1* 9/2005 Jungreis et al. ................ 703/1
2006/0020629 A1* 1/2006 Ramani et al. ........... 707/104.1
2006/0100829 A1* 5/2006 Lynch et al. ................... 703/1
2006/0117012 A1* 6/2006 Rizzolo et al. ................. 707/9
2006/0250418 A1* 11/2006 Chartier et al. ............. 345/619
2008/0172208 A1* 7/2008 Lechine ......................... 703/1

OTHER PUBLICATIONS

Karniel, A., et al., "Decomposing the Problem of Constrained Surface Fitting in Reverse Engineering," *Computer-Aided Design* 37:399-417 (2005).
Latham, R.S. and Middleditch, A.E., "Connectivity Analysis: a Tool for Processing Geometric Constraints," *Computer-Aided Design* 28(11):917-928 (1996).
Yingxiu, O., et al.: "WSCAD: a Collaborative CAD System Based on Web Service" The 8th International Conference on Xiamen, China May 26-28, 2004, USA, *IEEE* 1:272-277 (2004).

* cited by examiner

*Primary Examiner*—Paul L Rodriguez
*Assistant Examiner*—Kandasamy Thangavelu
(74) *Attorney, Agent, or Firm*—Hamilton, Brook, Smith & Reynolds, P.C.

(57) ABSTRACT

Disclosed is a method and system of computer aided design of a product comprising a set of objects (11-51). The invention system and method identify (S10) constraints (1121-4151) linking objects (11,51) of said set of objects. Each of the identified constraints is oriented from a first object to a second object so as to ensure, upon solving (S90) the constraints, that the first object is not moved provided that all other of said constraints are solved. The invention system and method further test whether said constraints can be solved upon modifying one oriented constraint (4151) amongst the identified constraints. The invention system/method returns a suggestion (110) for modifying said one oriented constraint (4151).

20 Claims, 8 Drawing Sheets

110
CATIA V5
File Edit View Insert Format Tools Help ENOVIA V5 SmarTeam
120
130
10
1020
250
55
2030
-20
150
20
30
160
1030
100
140
Brake Search Caliper Impact John Doe Community All Update 950, 960
Network Interface 986
System bus 979
Central Processor Unit 984
I/O Devices Interface 982
Memory 990
Routine 992
Data 994
Disk Storage 995
OS Program 992
Data 994

METHOD AND COMPUTER PROGRAM PRODUCT OF COMPUTER AIDED DESIGN OF A PRODUCT COMPRISING A SET OF CONSTRAINED OBJECTS

RELATED APPLICATION

This application claims priority under 35 U.S.C. § 119 or 365 to European Application No. EP 06292061.6,filed Dec. 28, 2006.

The entire teachings of the above application are incorporated herein by reference.

Also incorporated herein by reference in its entirety is European Patent Application No. 06292062.4 filed Dec. 28, 2006 by assignee of the present invention.

FIELD OF INVENTION

The invention relates to the field of computer programs and systems, and more specifically to a method of computer aided design of a product comprising a set of modeled objects, wherein said objects are linked by constraints.

BACKGROUND OF THE INVENTION

Computer-aided techniques include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically. CAD flies contain specifications, from which geometry is generated, which in turn allow for a representation to be generated. Specifications, geometry and representation may be stored in a single CAD file or multiple ones. CAD systems include graphic tools for representing the modeled objects to the designers; these tools are dedicated to the display of complex objects—the typical site of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). For instance, the digital product may be first defined and simulated using an appropriate application. Then, the lean digital manufacturing processes may be defined and modeled.

The PLM solution provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

Amongst other features, modeling in CAD applications often requires defining not only the geometric objects, but also the functional dependences between the said objects. This is usually achieved with the help of constraints. A constraint (e.g. a geometric constraint) is a relation among geometric objects that should be satisfied. For example, one may require that a first object is located at a given distance (offset) from a second object.

This way of designing is actually far from the usual procedural way of "thinking" of computers. In contrast with a procedural approach, a declarative description of geometry is much closer to human.

Recent geometric modelers offer a solution to this problem. The geometry can be described by defining constraints among geometric elements. Thanks to a constraint solver, the designer only specifies object shape and use in a declarative way, and the system takes care of making the drawing in accordance to the specification. The user specifies what to draw and not how to draw it.

In a number of existing CAD computer-based methods implementing constraints, the constraints are grouped in a network and solved all at the same time, using e.g. variational techniques. A variational solver processes the constraints without the need of arranging them in a predefined order. The declarative nature of constraints and e.g. the variational approach of solving makes all that components of the system are treated on a same footing.

A drawback with such methods, when solving the constraints, is that all involved parts may be moved, owing to side effects, resulting in possible conflicts between people working in a collaborative way. For instance, the first and second sets of parts designed by first and second teams, respectively, wherein parts in both the first and second sets are connected by constraints. Solving constraints connecting notably a part of the first set and a part of the second set is likely to change the relative positions of parts within the first or the second set, hence the possible conflicts.

One also knows CAD software is based on methods implementing oriented constraints, wherein said orientations are frozen, e.g. in connection with the relative order allocated when positioning the constrained objects. Allocating a relative order is similar in spirit to procedural schemes.

With such methods, in case of an impossibility of solving the constraint occurs, the designer is informed accordingly. At the best, the system only informs the designer that it can not find a solution but it does not provide him with any proposal. Then, the designer has to understand the origin of said impossibility and likely to "rethink" the definition of the objects and/or their relations. Such steps are time consuming.

Therefore, there is a need for a method of computer aided design allowing for assisting a designer in case of an impossibility of solving constraints occurs.

In addition, another problem inherent to methods implementing oriented constraints is that such methods suppose that a relative order in positioning objects can be allocated. Now, this cannot be always achieved. For some product configurations, this can even be impossible. Thus, the known technologies of oriented constraints are not suitable for some products. At least, the number of possible combinations of parts (e.g. the mechanical scenarios) is reduced compared with methods using non-oriented constraints. Hence, in addition to the above requirement (assisting the designer), the method should preferably allow for increasing the possibilities of combinations of parts, compared with existing solutions.

SUMMARY OF THE INVENTION

In one embodiment, the invention therefore provides a method of computer aided design of a product comprising a set of objects, said method comprising a step of:

- identifying constraints linking objects of said set of objects, each of said constraints being oriented from a first object to a second object so as to ensure, upon solving the constraints, that the first object is not moved provided that all other of said constraints are solved,
- the method further comprising steps of:
- if an impossibility of solving said constraints is detected, testing whether said constraints can be solved upon modifying one oriented constraint amongst said constraints; and
- returning a suggestion for modifying said one oriented constraint.

In other embodiments, the method according to the invention may comprise one or more of the following features:

- the method further comprises a step of modifying said one oriented constraint, upon user action;
- the step of modifying said one oriented constraint comprises ignoring the orientation of said one oriented constraint;
- the step of modifying comprises transforming said one oriented constraint into a non-oriented constraint;
- the step of modifying comprises inverting the orientation of said one of said constraints;
- the method further comprises, after the step of modifying, steps of: finding a sequential order in solving said constraints, according to the constraints as modified after the step of modifying; and solving the constraints according to the sequential order;
- the step of finding a sequential order uses a graph;
- the method further comprises a step of: displaying within a graphical user interface of a computer system the set of objects and the oriented constraint as symbols, wherein the selection of one of said oriented constraints or one of a respectively linked first object or second object allows for modifying said one of said constraints;
- the invention method, wherein the graphical user interface is further adapted to display a 3D representation of the set of objects;
- the step of returning a suggestion further comprises: highlighting in the graphical user interface a symbol representative of said one oriented constraint;
- the constraints identified at the step of identifying further comprise at least one non-oriented constraint;
- the method further comprises, at the step of testing, recursively ignoring the orientation of the oriented constraints as identified, so as to find said one oriented constraint;
- the step of testing further comprises choosing said one oriented constraint according to one criterion; and
- said criterion is the least relative displacement of the objects of the set.

The invention further proposes a computer-readable product for computer aided design of a product comprising a set of objects, the product comprising code means designed for implementing the steps of the method according to the invention.

The invention still concerns a computer system for computer aided design of a product comprising a set of objects, the system comprising means designed for implementing the steps of the method according to the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
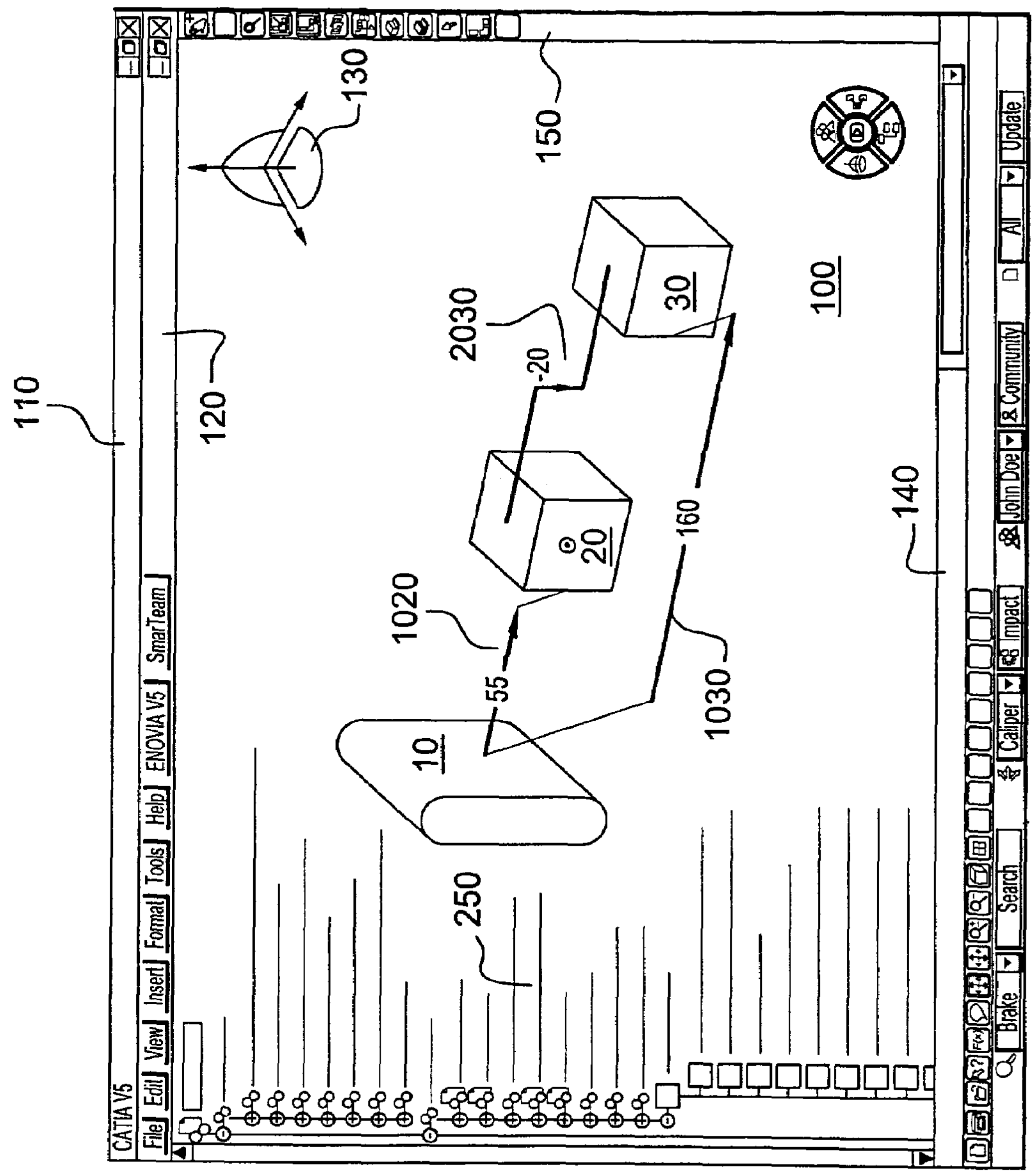
FIG. 1 is an example screenshot of a graphical user interface of CAD system, which represents a view of objects linked by oriented constraints.
Figure 2:
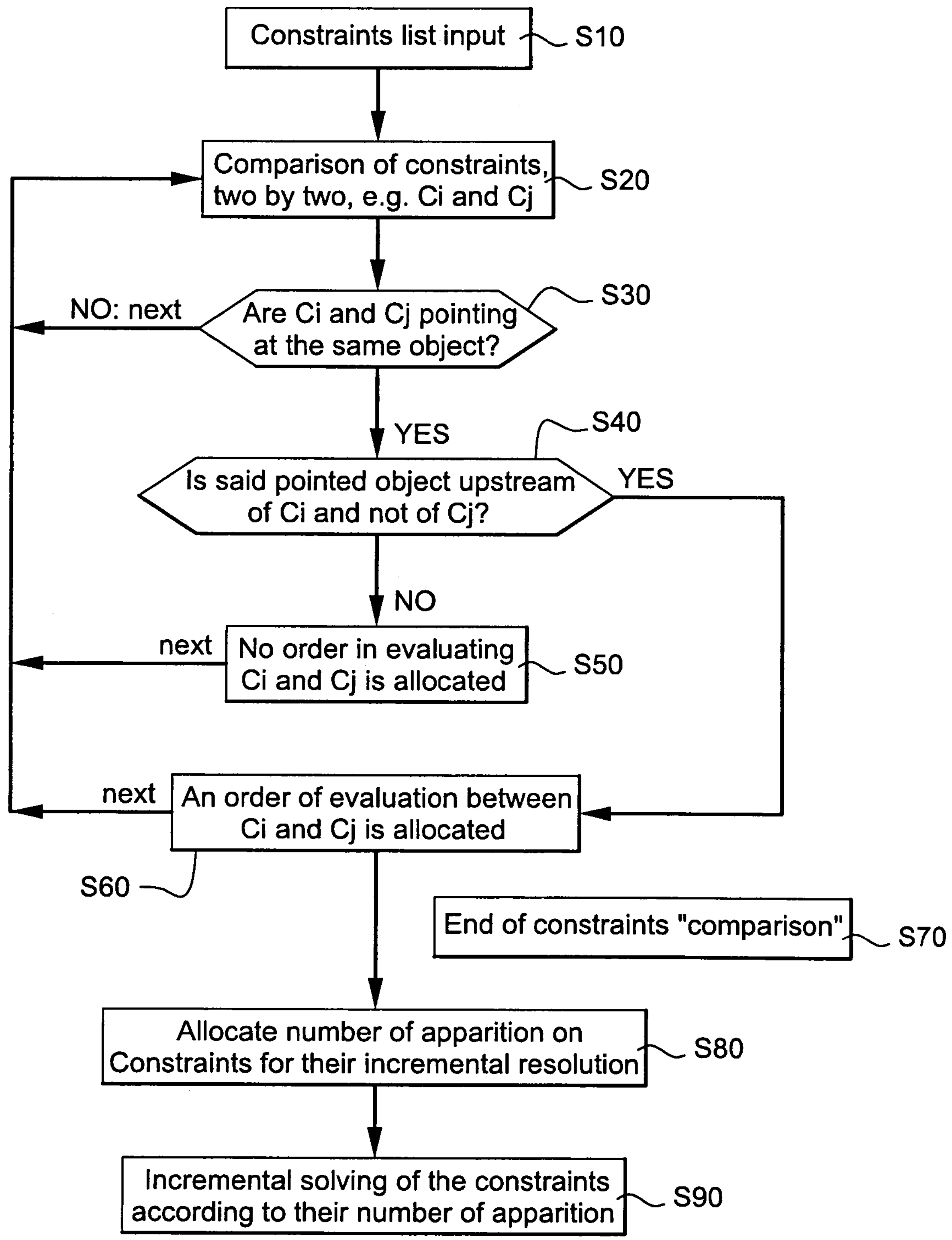
FIG. 2 is a flowchart representing steps for solving an hybrid network of constraints according to the present invention.
Figure 3:
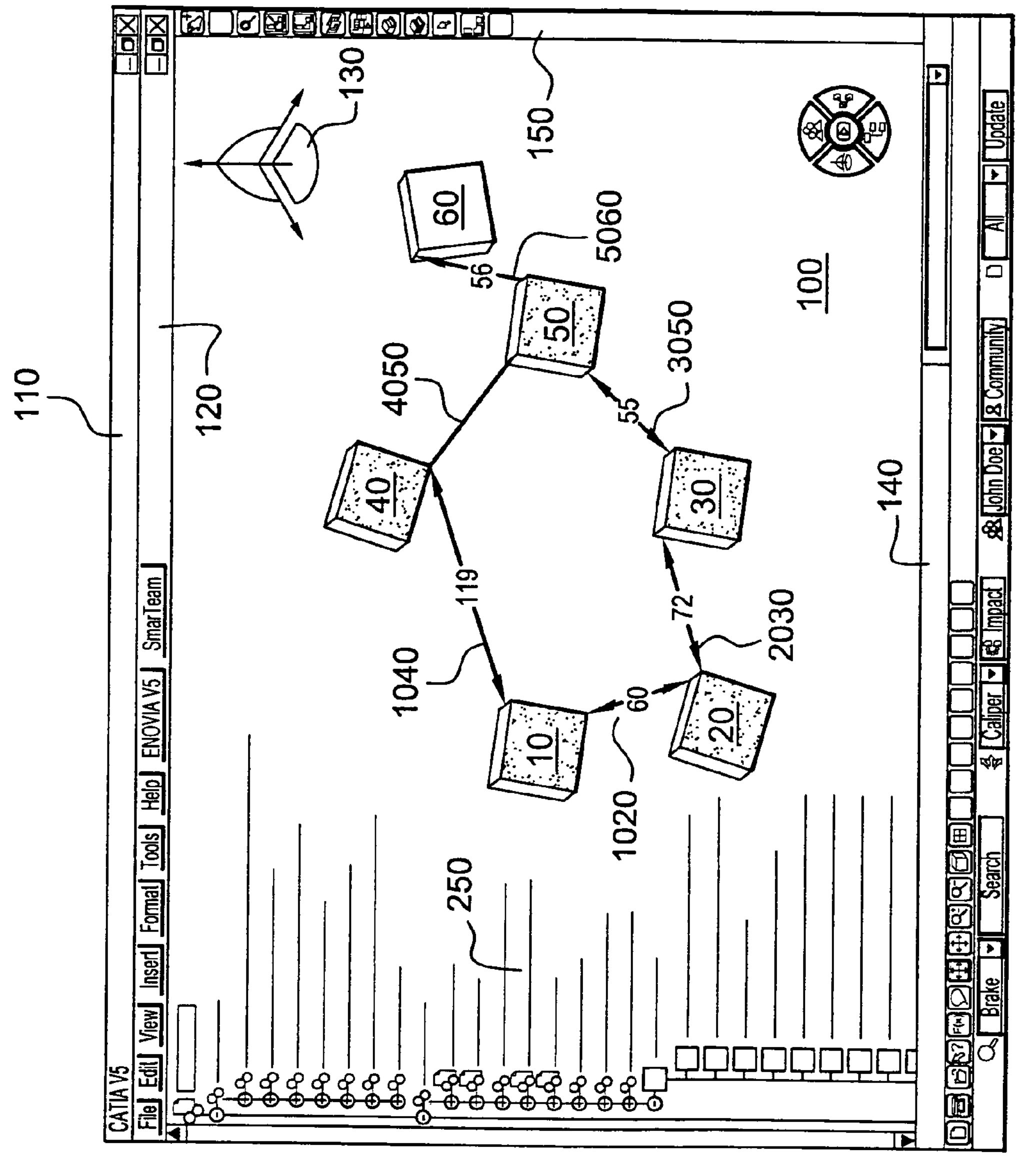
FIG. 3 is an example of a screenshot of a view of parts linked by both oriented and non-oriented constraints.
Figure 4:
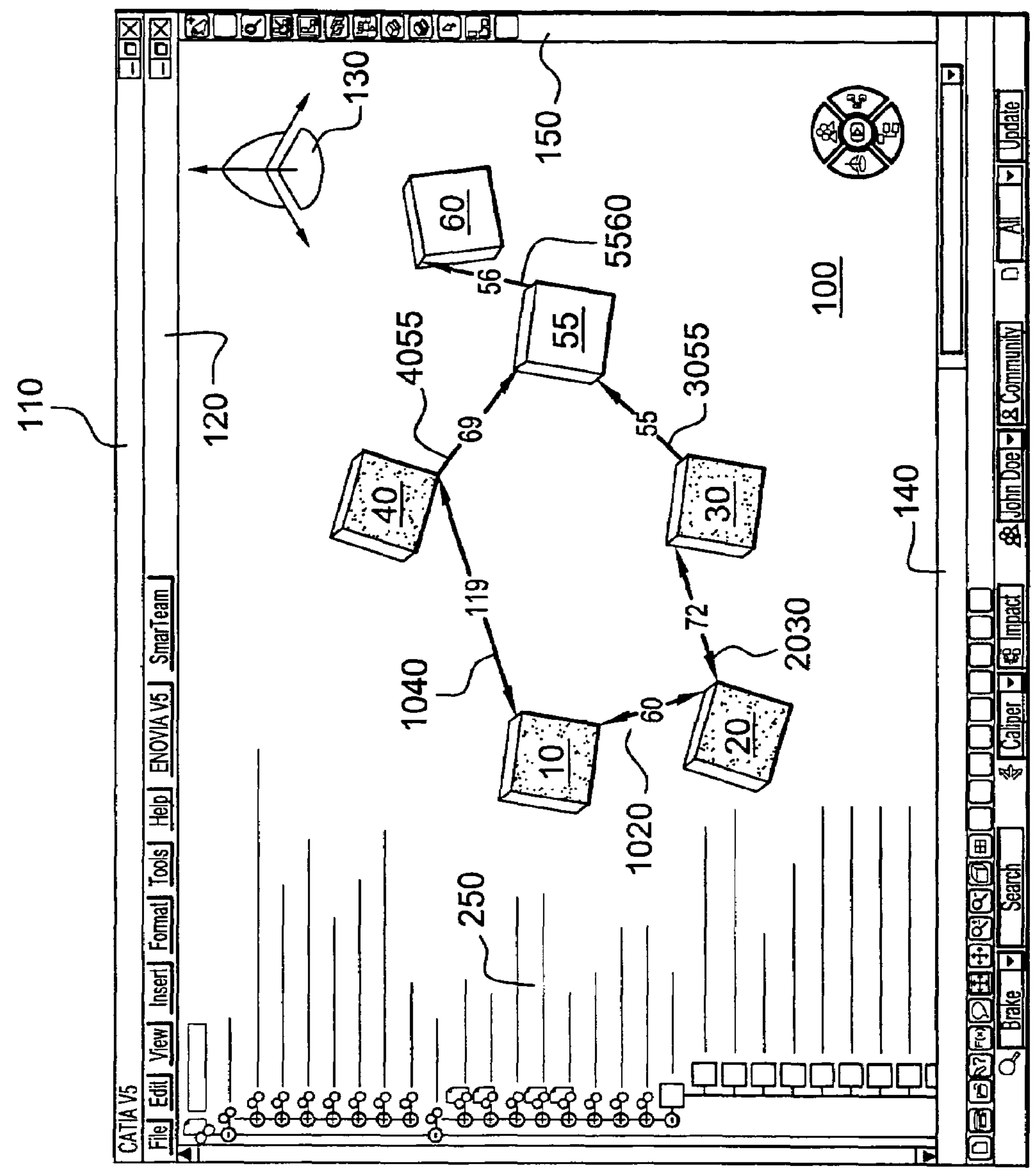
FIG. 4 is an example of a screenshot of a CAD system display representing the view of FIG. 3, wherein some of the constraints have been oriented upon user action.
Figure 7:
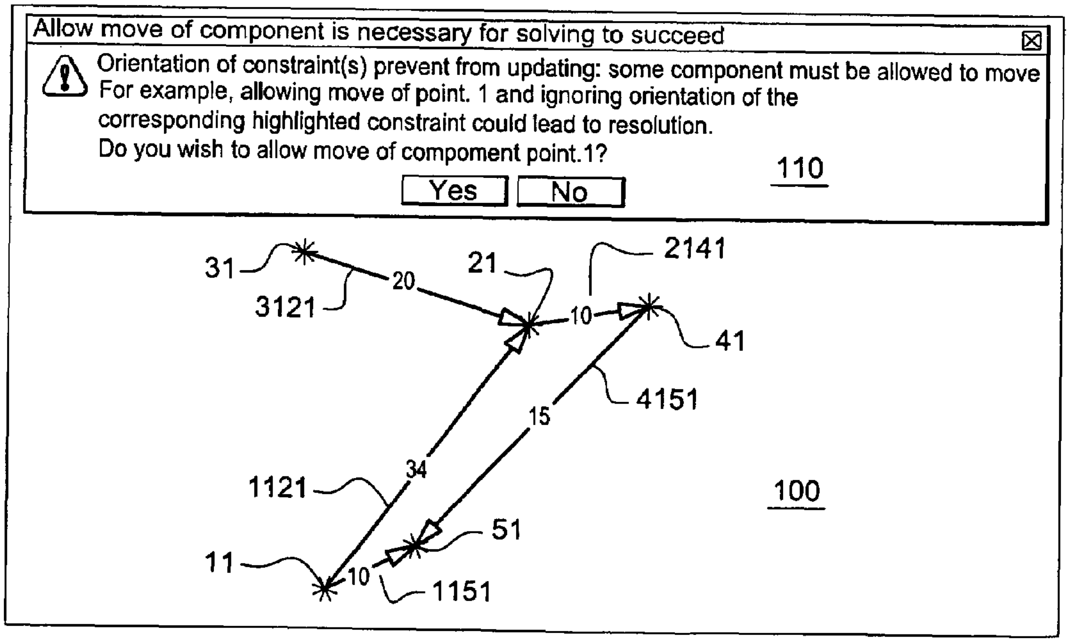
FIG. 7 is an example of a screenshot representing a modal window assisting the user in solving the network of constraints of FIG. 6.
Figure 8:
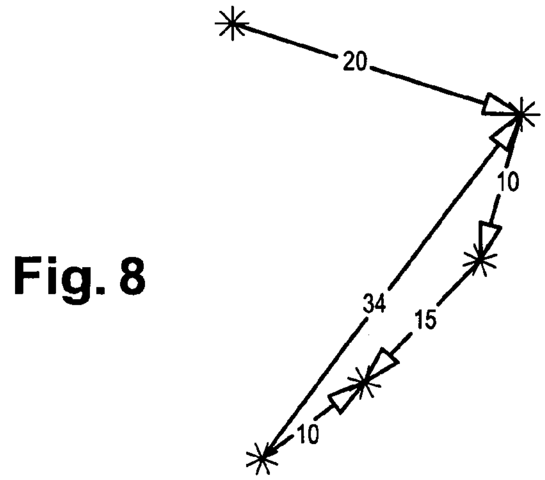
FIG. 8 shows the network of constraints of FIG. 7, after solving.

A system embodying the invention will now be described, by way of non-limiting examples, and in reference to the accompanying drawings, wherein FIG. 1 exemplifies a network of oriented constraints and FIGS. 2-4 illustrates how a network comprising both oriented and non-oriented constraints is managed, in an alternative embodiment. FIGS. 5-8 illustrates a situation wherein an impossibility of solving a set of constraints is detected, and subsequent steps taken according to the invention, to assist the user. FIG. 8 exemplifies assisting the user in editing constraints.

As to summarize the invention, it is proposed a method of computer aided design of a product comprising a set of objects. A network of constraints linking said objects is identified. In an embodiment, each of said constraints is an oriented (or directed) constraint, oriented from a first object to a second object of the set so as to ensure, upon solving the network of constraints, that the first object is not moved provided that all other of said constraints are solved. Accordingly, orienting a constraint from an object of a first set of objects (e.g. managed by a first team) to a second object of a second set (e.g. under design by a second team), allows for preserving the initial design of the first set when solving the network of constraints.

All the more, if an impossibility of solving said constraints is detected, the method tests whether said constraints can be solved upon modifying one oriented constraint amongst said constraints. A modification of the constraint may for example consist in temporarily ignoring the orientation thereof. Accordingly, a suggestion for modifying said one oriented constraint is returned to the user. The user is thus prompted to the problem, which he/she can solve efficiently (in practice, a simple validation of the suggestion is sufficient).

In one of the variants discussed in details below, the constraints identified may further comprise one or more non-oriented constraints. Accordingly, the number of possible combinations of parts is increased compared with networks of oriented constraints only, notably when the system considered is under-constrained.

Going now into details: as to make more explicit what an oriented constraint is, FIG. 1 shows an example of a screenshot of a graphical user interface (or GUI) 100 of CAD system, which represents a view of objects 10, 20, 30 linked by oriented constraints 1020, 1030, 2030.

The exemplified GUI 100 is a typical CAD interface, having standard menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or representing the modeled product comprising the objects 10, 20, 30 displayed in the GUI. The software tools in question may for instance be grouped in workbenches. Otherwise put, each workbench comprises a different subset of software tools. In particular, one of these may be an edition workbench, suitable for editing geometrical features of the modeled product. In operation, a designer may for example pre-select one of the displayed objects 10, 20, 30 and then initiate an operation (e.g. change the dimension, color, etc.) by selecting an appropriate icon. For example, typical CAD operations are the modeling of the punching or the folding of a 3D modeled object displayed on the screen.

The edition workbench may further be adapted for displaying data 250 (known as a feature tree) related to the displayed product 200. In the example of FIG. 1, the data 250 and 3D picture 200 pertain to a simple assembly of three basic shapes 10, 20, 30. Data 250 are displayed in the form of a tree, on the left-hand side of the GUI. The GUI may further show other type of graphic tool 130, for example for indicating the 3D orientation of the objects.

For example, one may use a computer system which is a component of a PLM system equipped with a database, implemented in a computer network. Thus, said computer system may be referred to as a PLM system.

The GUI 100 is run on a computer having a display and memory and being further connected to the computer network, which may benefit from a product data manager (PDM) system. The PDM system allows for the management of numerous documents and data, possibly hierarchically interrelated. A plurality of users may thus work in a collaborative way, on different objects/products, using for example similar local applications and a common environment. For instance, GUIs similar to that identified by reference numeral 100 displayed in FIG. 1 may be run on other computers of the network.

Reverting now to the objects 10, 20, 30 displayed: the object 20 is connected to object 10 via constraint 1020. Similarly, the pairs of objects 10, 30 and 20, 30 are connected via constraints 1030 and 2030, respectively. Said constraints are positioning or offset constraints, having norm values of 55, 160 and 20, respectively. Positive (implicit) or negative sign denotes algebraic values. The constraints may possibly be represented offset to their respective object, as shown, for the sake of clarity. Constraints 1020 and 1030 link respective centers of opposed faces of objects 10, 20 and 10, 30. The constraint 2030 is an offset between respective upper faces of the objects 20, 30.

All the constraints are oriented in this example. In particular, constraint 1020,1030 and 2030 are respectively oriented from objects 10 to 20, 10 to 30 and 20 to 30. An oriented constraint is here defined as follows: a constraint oriented from a first object to a second object ensures that the first object is not moved provided that all other constraints are solved, when solving the network of constraints. Preferably, it is provided that the absolute position of the first object will not move, which makes the set of objects easier to manage. Accordingly, upon solving the constraints, the second object may move if not disallowed due to other existing oriented constraints. In the case of FIG. 1, suppose that constraints 1020, 1030, and 2030 are solved. Then, the user may want to change the norm value of constraint 1030 to 170 (editing the constraints will be detailed below). He/she edits the constraint 1030 accordingly and subsequently calls the constraint solver. By so doing, the object 30 may slide along the direction of the constraint 1030. Indeed, nothing prevents said object 30 to move, not even the constraint 2030 as a vertical offset of −20 can be maintained when sliding the object 30. Similarly, it would be possible to slightly increase the norm of constraint 1020, e.g. from 55 to 60. By so doing, object 20 would slide to the right of the screen, along the constraint 1020.

As will be discussed hereafter, the present invention may apply to a network composed of oriented constraints only or to an hybrid network of constraints (that is, containing both oriented and non-oriented constraints). An hybrid network simplifies collaborative design of interrelated objects.

In this respect, the present inventor has realized that managing both oriented and non-oriented constraints in a single network of constraints can be made possible owing to the definition itself of the oriented and non-oriented constraints. Some comments are in order.

As known in the art, a network of non-oriented constraints may be solved e.g. thanks to a variational constraint solver. In contrast, a network solely composed of oriented constraints may be solved e.g. through a procedural approach. Such implementations are individually known. Now, it has been realized that an hybrid network (comprising both oriented and non-oriented constraints) comprises sub-networks of non-oriented constraints, which can be locally solved thanks e.g. to a variational solver. Next, subsets connected by oriented constraints may be benefit from e.g. a procedural approach. For instance, in a brute force method, an algorithm may systematically search all constraint paths and stops when finding one that allows for solving the constraints.

However, such an approach is obviously not the most efficient. In this respect,

FIG. 2 shows a flowchart representing possible steps S10-S90 for efficiently solving the network of hybrid constraints. In particular, said steps allows for finding (steps S20-S80) a sequential order in solving the constraints of the network and then solving (step S90) said constraints.

Typically, a user proceeds, thanks to the invention, to modify non-oriented or oriented constraints of the single network. When updating the constraints, the algorithm acknowledges and identifies (step S10) a list of constraints taken as input.

At step S20, the constraints are compared, e.g. two by two. A given pair of constraints is considered, say Ci and Cj.

At step S30, it is tested whether Ci and Cj points at the same object. If not, the algorithm returns to step S20, that is, another pair is considered. If yes, it is tested (Step S40) whether the pointed object is upstream of Ci and not of Cj, keeping in mind the above definition of an oriented constraint.

If not, no relative order in evaluating Ci and Cj is allocated (step S50), else a relative order is given (step S60). The algorithm then proceeds with another pair of constraints (go to step S20).

Upon completing the comparison of constraints (step S70), an order of evaluation of each of the constraints can be given (S80).

Next, an incremental solving of the constraints can be carried out, thanks to the allocated number of apparition (S90). In this respect, one keeps in mind that some of the constraints (non-oriented ones) may be given a same number of apparition, thus forming a sub-network of non-oriented constraints systems which can be locally solved, e.g. thanks to a variational solver.

The above steps are typically implemented using a graph. At the build time, the graph is build. At the run time, the graph is browsed, allowing for solving the constraints. The graph may further advantageously be reduced at the build time, using known techniques of graph reduction.

FIG. 3 shows an example of a screenshot of a view of objects linked by both oriented and non-oriented constraints.

As in FIG. 1, FIG. 2 represents a GUI 100 displaying objects 10-60 connected by constraints (constraint xy connects objects x and y). In this case, most of constraints 1020-4050 are non-oriented constraints, symbolized as double arrows. One of the constrains, constraint 5060 is oriented from object 50 to object 60 (single arrow), implying that object 50 will not move when updating constraint 5060, provided that all other constraints 1020-4050 are already updated. Accordingly, first and second teams may independently design the sub-networks 10-50 (or 1020-4050, in terms of constraints) and 60 (or 5060), respectively.

Said constraints may be edited/modified by a user. The user typically requests via the GUI 100 to modify an oriented or a non-oriented constraint. For example, both oriented 5060 and non-oriented constraints (1020-4050) are displayed as respective symbols, the selection of which allows for modifying the constraints. Thus, if the second team updates constraint 5060 (for example modify its norm value), there is no impact on sub-network 1020-4050 (if already updated). In any case, only object 60 will move. Collaborative work is thereby facilitated. As said, the subgroup 1020-4050 may be locally solved, e.g. according to variational techniques.

FIG. 4 is an example of a screenshot of a CAD system display representing the view of FIG. 3, wherein some of the constraints have been modified upon user action.

As one of the possible modifications of the constraints, a user may request, via GUI 100, to switch a non-oriented constraint to an oriented constraint and vice-versa. This is exemplified in FIG. 4, wherein non-oriented constraints 3050 and 4050 have been transformed (compared with FIG. 3) into oriented constraints 3055 and 4055, respectively. Here the norms remain unchanged. Yet, the new orientations of the constraints have different outcomes, compared with FIG. 3. Changing the orientations helps (e.g. an administrator) in managing the design tasks in a collaborative context.

Such a modification may be subjected to verification that the person who requests the change is authorized to do so. This might happen in a collaborative context, wherein an authorized administrator is empowered to modify the orientations of the constraints.

Figure 5:
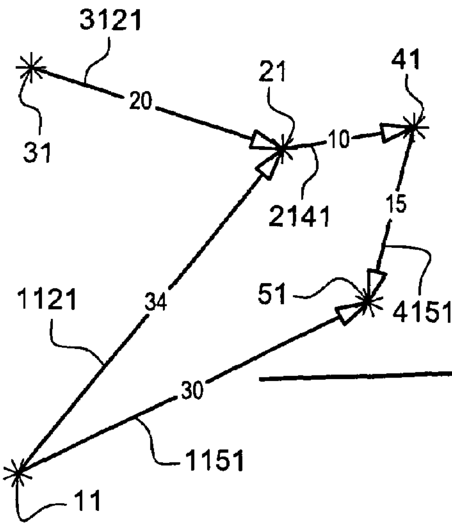
FIGS. 5 and 6 illustrate schematically a user request for changing an offset value in a constraint by a user.
Figure 6:
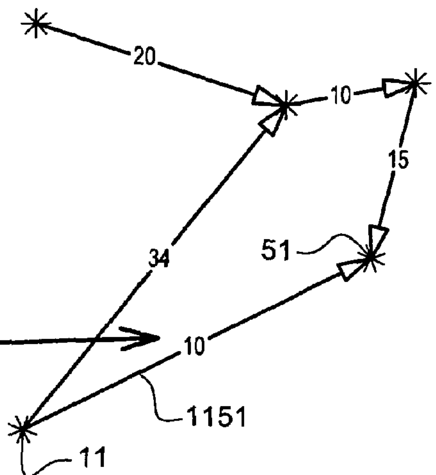

FIGS. 5 and 6 illustrate schematically a user request for changing a value of a constraint by a user. FIG. 5 shows a subpart of network of constraints, comprising oriented constraints (only) linking objects symbolized as points 11-51. Here, the interplay of oriented constraints makes that only point 51 may move upon modifying any norm values of constraints 1121-4151.

FIG. 6 shows a new asked offset of 10 for the constraint 1151. Said new asked value makes that there is no solution by moving only point 51. The CAD system may in this case react conveniently by indicating to the user the impossibility of solving the constraints. For example, a window may appear in the screen telling accordingly. The corresponding constraint 1151 may for instance be e.g. dashed, as in FIG. 6, or highlighted.

According to the invention, the system may however be made more proactive, as will be described in reference to FIG. 7. FIG. 7 is an example of a screenshot representing a modal window 110 popping up in the GUI for assisting the user in solving the network of constraints of FIG. 6.

Here, as an impossibility of solving the constraints was detected, the algorithm proceeds with testing whether said constraints can be solved by modifying one oriented constraint, or a plurality of oriented constraints, if necessary. This can he achieved e.g. by recursively ignoring orientation of one of the constraints until finding the constraint for which the system can be solved. If no constraint is found, pairs of constraints can be tested, etc.

Note that the step of testing may, in a variant, further comprise choosing said one oriented constraint according to one criterion (which may for example correspond to the least relative displacement of objects of the set). Thus, if several constraints are returned, the modification of which would allow for solving, a particular constraint (and then a related object) can be chosen according to this criterion.

Ignoring the orientation of a constraint can be made either temporarily or permanently, which in the latter case amounts to transform the oriented constraint into a non-oriented one. Once said constraint has been found, the system can deduce which object (or point in the example of FIG. 7) is impacted by the critical constraint found. What is analyzed in terms of constraints can thus be translated in terms of objects, which is more natural for a user.

Accordingly, a modal window 110 (also modal dialog) may appear, proposing the user to allow for moving the critical point 41 (corresponding to the "point.1" evoked in the modal window of FIG. 7), which amounts, in the viewpoint of the algorithm, to return a suggestion for modifying said at least one oriented constraint.

If the user clicks yes, that is, if the user accepts moving point 41, the orientation of the critical constraint 4151 is ignored and the constraints can be solved. The result appears in FIG. 8.

The invention therefore implements a CAD expert system assisting the user in view of solving the constraints, making it possible to save a substantial time in a number of situations.

Figure 9:
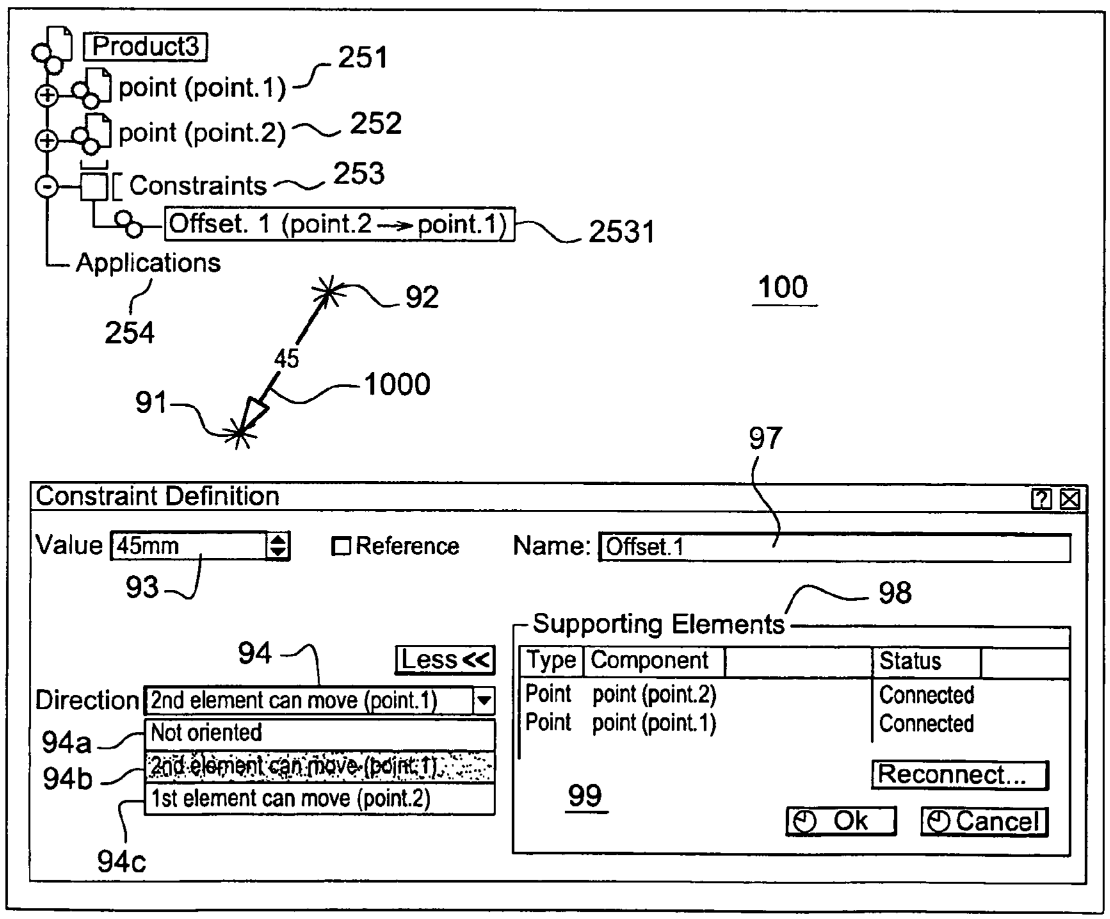
FIG. 9 is an example of a screenshot representing a modal window for assisting the user in editing a constraint.

Next, the GUI may, in an embodiment of the invention, allow for dynamic modifications of the orientation of the constraints, as will be described now in reference to FIG. 9. FIG. 9 shows an example of a screenshot representing a modal window assisting the user in editing constraints.

Here, only one oriented constraint 1000 is displayed in the GUI 100 (partial view), for the sake of simplicity (a plurality of oriented constraints is likely to be identified, in practice).

Said constraint(s) is (are) oriented from a first object 92 to a second object 91, which are also displayed in the GUI. The constraint ensures that, upon solving the constraints, the first object 92 is not moved. Preferably, it is ensured that the absolute position of the first object 92 will not move, so as to facilitate the update of the whole product 91-92. Said oriented constraint is displayed as an arrow 1000, reflecting its orientation. Objects 91-92 of the product and the constraint 1000 are preferably displayed as intelligible 3D representations, as in FIG. 9.

A feature tree 250 might be displayed in the GUI, as in the example of FIG. 9. The tree 250 indicates a first object ("point. 1") 251, a second object ("point.2") 252 and comprises a constraint section or leave 253. Said section, once expanded, indicates the occurrence 2531 of a unique constraint (that is, corresponding to the constraint 1000 displayed), in this example. As indicated, said constraint is oriented from object "point.2" to object "point. 1". Objects referred to as "point. 1" and "point.2" in the tree correspond to objects displayed in the view under references 91 and 92. It is further indicated that the constraint in question is an offset positioning constraint, as in the previous examples. The feature tree 250 also contains an application section 254, which could be expanded via a user action.

In this respect, constraints are stored in a database as components in relation to the products and parts or objects linked by the constraints. The feature tree reflects the arrangements of the stored components, and somehow the administrative structure of the product 91-92. One should obviously keep in mind that in the case of a complex product, the tree would comprise thousands of leaves, which are not easily apprehensible.

More practical, the embodiment of FIG. 9 allows for modifying the product structure by directly selecting the constraint 1000 as displayed in the GUI. As objects 91-92 of the product and the constraint 1000 are displayed as intelligible 3D representations, a user only needs finding said constraint in the view and select it in the view, instead of scanning lines of an administrative product structure.

The arrow representing the constraint may for instance be selected by the user thanks to a pointing device (such as a mouse, trackball or touchscreen), which would result in opening a modal window (or wizard) 99.

The GUI 100 is accordingly designed for receiving selection of the constraint (for example thanks to a user-pointer) and a request for modification of the orientation of said constraint 1000 (this will be detailed below). After receiving the request, the constraint is modified accordingly, which will amount to identify a new list of constraints as input, see step S110 in reference to FIG. 2.

Said modal window 99 may comprise one or more of the following fields 93-98. Each of said fields maybe supplemented by suitable widgets or controls, usual in the art, which allow for scrolling/editing/modifying data in the field.

In field 93, the current value of the offset is displayed, which can be changed by the user thanks to a drop down list.

In field 94, a current status or implication of the constraint is displayed to the user, for example "2nd element can move (point.1)", according to the actual constraint. Thanks to a drop down list, the user may change the constraint into a non-oriented constraint (by selecting the line 94*a*) or invert the orientation of the constraint (by selecting lines 94*b*-*c*). Thus, various ways of modifying the orientation of a constraint are available to a user.

Field 97 display the current name of the constraint, preferably user-modifiable (text box), corresponding to the leave 2531 of the feature tree 250.

The section 98 displays information relative to the linked objects 251, 252, displayed as 91 and 92 in the view.

After edition, the user can press the OK button, which results in modifying the constraint, or the cancel button.

Thus, the modal window 99 allows for modifying the orientation (and possibly other features of the) constraints of the networks.

In a variant, e.g. when the network of constraints is initially composed of oriented constraints only, the modal window may be more particularly intended for an administrator, and accordingly allows for inverting the constrain orientations but not changing a norm value.

In another variant, the modal window may be more particularly intended for a designer and accordingly allows for changing the offset value but not inverting the constraint orientations.

More generally, the functionalities of the modal window may vary according to given access rights, e.g. subjected to authentification.

The invention is not limited to the preferred embodiments described in reference to the drawings. Notably, although merely offset positioning constraints have been used to illustrate embodiments of the invention, other types of constraints could be contemplated. Thus, the invention may also apply to angle, parallelism tangency, coincidence, chiral, or topological constraints. Finally, in an embodiment, a constraint according to the invention might be understood as any relation linking two objects.

In addition, the present invention may be applied to a concurrent engineering environment, with all its related people and organization privileges and read and write access rights considerations. In such a case, the process according to the invention will enable a given user/designer, confronted to an impossibility of solving, to ask for an authorization to move an object (read/write access) owned by another user/designer. None among these two (or more) users will have to analyze the network of constraints to find a solution to the system; the process will solve it for the users. Users are only required to validate a pre-processed solution, and they are assured that all the specifications are respected.

Figure 10:
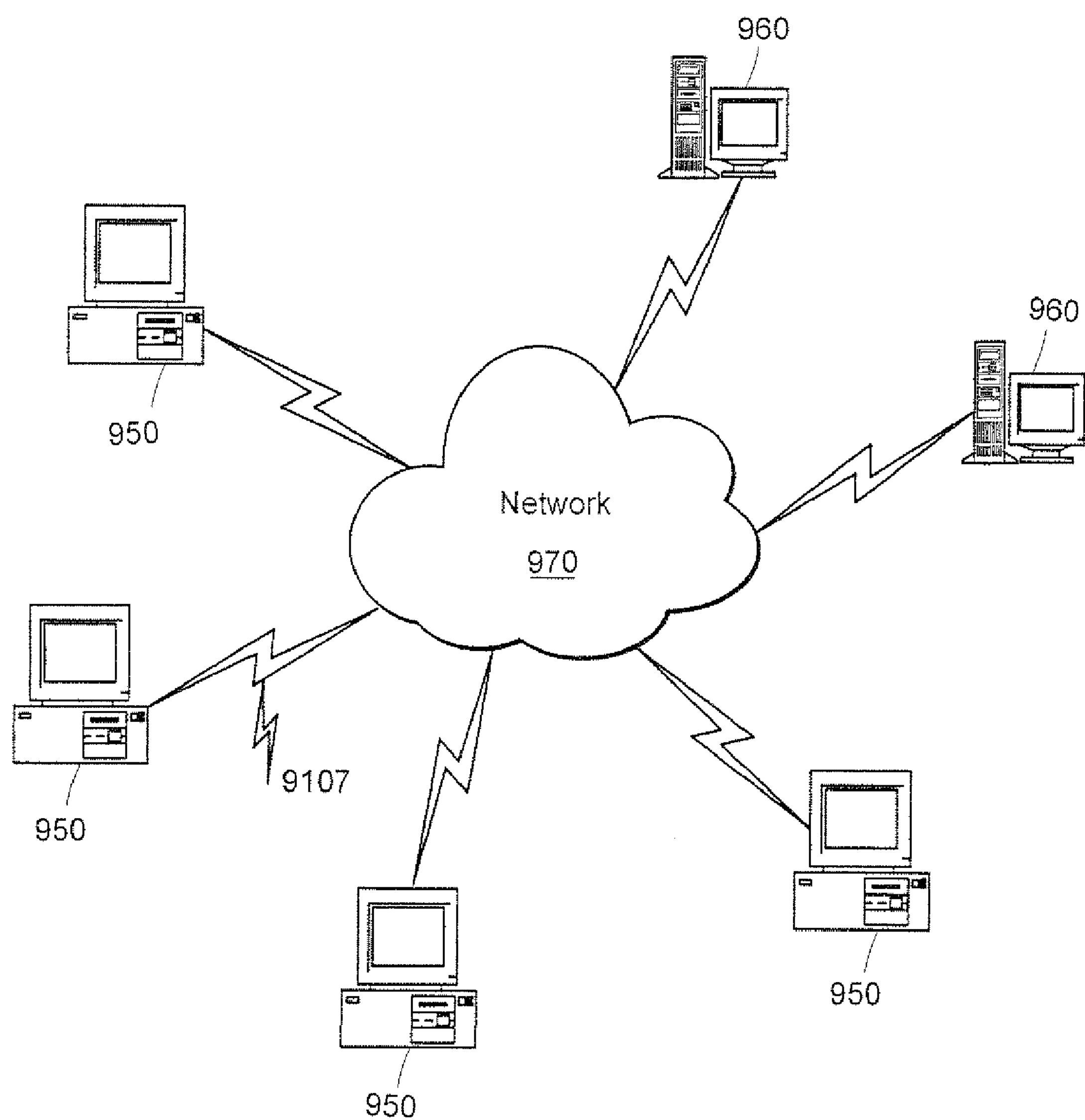
FIG. 10 is a computer network environment in which embodiments of the present invention are implemented.

FIG. 10 illustrates a computer network or similar digital processing environment in which the present invention may be implemented.

Client computer(s) 950 and server computer(s) 960 provide processing, storage, and input/output devices executing application programs and the like. Client computer(s) 950 can also be linked through communications network 970 to other computing devices, including other client devices/processes 950 and server computer(s) 960. Communications network 970 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
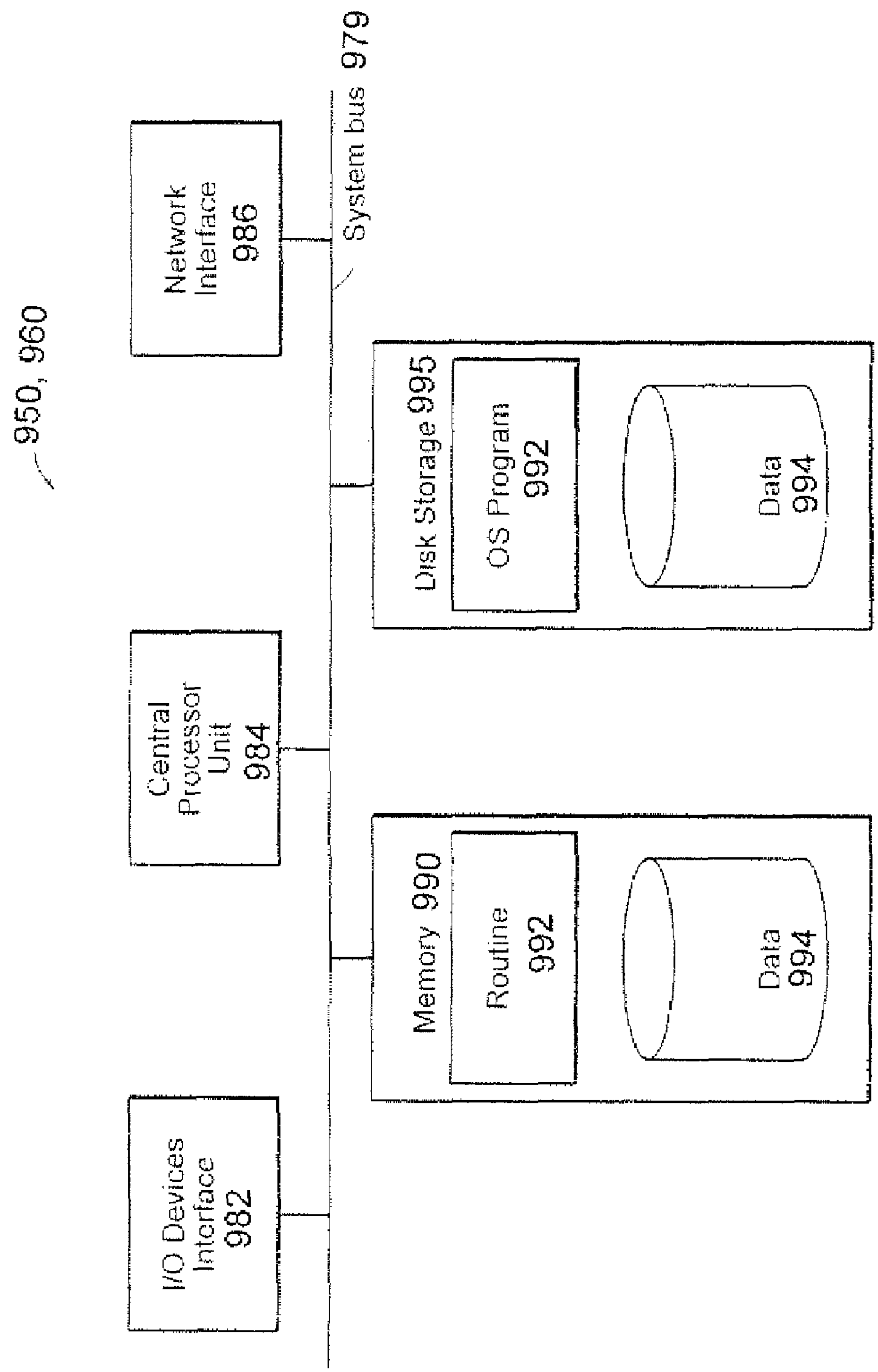
FIG. 11 is a block diagram of a computer node in the network of FIG. 10.

FIG. 11 is a diagram of the internal structure of a computer (e.g., client processor 950 or server computers 960) in the computer system of FIG. 10. Each computer 950, 960 contains system bus 979, where a bus is a set of hardware lines used for data transfer among the components of a computer or processing system. Bus 979 is essentially a shared conduit that connects different elements of a computer system (e.g., processor, disk storage, memory, input/output ports, network ports, etc.) that enables the transfer of information between the elements. Attached to system bus 979 is I/O device interface 982 for connecting various input and output devices (e.g., keyboard, mouse, displays, printers, speakers, etc.) to the computer 950, 960. Network interface 86 allows the computer to connect to various other devices attached to a network (e.g., network 970 of FIG. 10). Memory 990 provides volatile storage for computer software instructions 992 and data 994 used to implement an embodiment of the present invention (e.g., constraint management, wizard 99, tester and solver-suggestion engine with corresponding supporting method/process detailed above). Disk storage 995 provides non-volatile storage for computer software instructions 992 and data 994 used to implement an embodiment of the present invention. Central processor unit 984 is also attached to system bus 979 and provides for the execution of computer instructions.

In one embodiment, the processor routines 992 and data 994 are a computer program product (generally referenced 992), including a computer readable medium (e.g., a removable storage medium such as one or more DVD-ROM's, CD-ROM's, diskettes, tapes, etc.) that provides at least a portion of the software instructions for the invention system. Computer program product 992 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 9107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 992.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 992 is a propagation medium that the computer system 950 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 10 and 11 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. A method of computer aided design of a product comprising a set of objects, said method comprising a step of:

identifying constraints linking objects of said set of objects, each of said constraints being oriented from a first object to a second object so as to ensure, upon solving the constraints, that the first object is not moved provided that all other of said constraints are solved;

if an impossibility of solving said constraints is detected, testing whether said constraints can be solved upon modifying one oriented constraint amongst said constraints;

returning a suggestion for modifying said one oriented constraint including displaying the suggestion to a user; and modifying said one oriented constraint upon user action;

wherein the step of modifying comprises transforming said one oriented constraint into a non-oriented constraint.

2. The method according to claim 1, wherein the step of modifying said one oriented constraint comprises ignoring the orientation of said one oriented constraint.

3. The method according to anyone of claim 1, further comprising, after the step of modifying, steps of:

finding a sequential order in solving said constraints, according to the constraints as modified after the step of modifying; and solving the constraints according to the sequential order.

4. The method according to claim 3, wherein the step of finding a sequential order uses a graph.

5. The method according to claim 1, further comprising a step of:

displaying within a graphical user interface of a computer system the set of objects and the oriented constraint as symbols, wherein the selection of one of said oriented constraints or one of a respectively linked first object or second object allows for modifying said one of said constraints.

6. The method according to claim 5, wherein the graphical user interface is further adapted to display a 3D representation of the set of objects.

7. The method according to claim 5, wherein the step of returning a suggestion further comprises:

highlighting in the graphical user interface a symbol representative of said one oriented constraint.

8. The method according to claim 1 wherein the constraints identified at the step of identifying further comprise at least one non-oriented constraint.

9. The method according to claim 8 further comprising, at the step of testing, recursively ignoring the orientation of the oriented constraints as identified, so as to find said one oriented constraint.

10. The method according to claim 1 wherein the step of testing further comprises choosing said one oriented constraint according to one criterion.

11. The method according to claim 10, wherein said criterion is the least relative displacement of the objects of the set.

12. A computer-readable storage medium comprising computer executable instructions which, when executed by a computer, causes computer aided design of a product comprising a set of objects, the computer-readable storage medium comprising instructions for:

identifying constraints linking objects of said set of objects, each of said constraints being oriented from a first object to a second object so as to ensure, upon solving the constraints, that the first object is not moved provided that all other of said constraints are solved;

if an impossibility of solving said constraints is detected, testing whether said constraints can be solved upon modifying one oriented constraint amongst said constraints;

returning a suggestion for modifying said one oriented constraint including displaying the suggestion to a user; and modifying said one oriented constraint upon user action;

wherein the step of modifying comprises transforming said one oriented constraint into a non-oriented constraint.

13. A computer system for computer aided design of a product comprising a set of objects, the computer system comprising:

identifying means for identifying constraints linking objects of said set of objects, each of said constraints being oriented from a first object to a second object so as to ensure, upon solving the constraints, that the first object is not moved provided that all other of said constraints are solved;

means for testing whether said constraints can be solved and if an impossibility of solving said constraints is detected, testing whether said constraints can be solved upon modifying one oriented constraint amongst said constraints;

suggestion means for returning a suggestion for modifying said one oriented constraint including displaying the suggestion to a user; and modifying means for modifying said one oriented constraint upon user action;

wherein the modifying comprises transforming said one oriented constraint into a non-oriented constraint.

14. A computer system as claimed in claim 13 further comprising modify means modifying said one oriented constraint, upon user action.

15. A computer system as claimed in claim 14 further comprising:

order means finding a sequential order in solving said constraints, according to the constraints as modified by the modify means; and solver means solving the constraints according to the sequential order.

16. A computer system as claimed in claim 14 further comprising display means displaying within a graphical user interface of a computer system the set of objects and the oriented constraint as symbols, wherein user selection of one of said oriented constraints or one of a respectively linked first object or second object allows for modifying said one of said constraints.

17. A computer system as claimed in claim 13 wherein the identifying means identifies at least one non-oriented constraint.

18. A method of computer aided design of a product comprising a set of objects, said method comprising a step of:

identifying constraints linking objects of said set of objects, each of said constraints being oriented from a first object to a second object so as to ensure, upon solving the constraints, that the first object is not moved provided that all other of said constraints are solved;

if an impossibility of solving said constraints is detected, testing whether said constraints can be solved upon modifying one oriented constraint amongst said constraints;

returning a suggestion for modifying said one oriented constraint including displaying the suggestion to a user; and modifying said one oriented constraint upon user action;

wherein the modifying comprises inverting the orientation of said one of said constraints.

19. A computer-readable storage medium comprising computer executable instructions which, when executed by a computer, causes computer aided design of a product comprising a set of objects, the computer-readable storage medium comprising instructions for:

identifying constraints linking objects of said set of objects, each of said constraints being oriented from a first object to a second object so as to ensure, upon solving the constraints, that the first object is not moved provided that all other of said constraints are solved;

if an impossibility of solving said constraints is detected, testing whether said constraints can be solved upon modifying one oriented constraint amongst said constraints;

returning a suggestion for modifying said one oriented constraint including displaying the suggestion to a user; and modifying said one oriented constraint upon user action;

wherein the modifying comprises inverting the orientation of said one of said constraints.

20. A computer system for computer aided design of a product comprising a set of objects, the computer system comprising:

identifying means for identifying constraints linking objects of said set of objects, each of said constraints being oriented from a first object to a second object so as to ensure, upon solving the constraints, that the first object is not moved provided that all other of said constraints are solved;

means for testing whether said constraints can be solved and if an impossibility of solving said constraints is detected, testing whether said constraints can be solved upon modifying one oriented constraint amongst said constraints;

suggestion means for returning a suggestion for modifying said one oriented constraint including displaying the suggestion to a user; and modifying means for modifying said one oriented constraint, upon user action;

wherein the modifying means inverts the orientation of said one of said constraints.

* * * * *